United States Patent [19]

Mattice

[11] Patent Number: 4,955,661
[45] Date of Patent: Sep. 11, 1990

[54] ENVIRONMENTALLY PROTECTED EXPANDABLE TRAILER

[75] Inventor: Richard E. Mattice, Oneonta, N.Y.

[73] Assignee: Medical Coaches, Incorporated, Oneonta, N.Y.

[21] Appl. No.: 340,695

[22] Filed: Apr. 20, 1989

[51] Int. Cl.$^5$ ............................................. B62D 39/00
[52] U.S. Cl. ....................................... 296/171; 296/26; 52/67
[58] Field of Search .......................... 296/26, 171, 175; 280/656; 52/67

[56] References Cited

U.S. PATENT DOCUMENTS

| | | | |
|---|---|---|---|
| 2,820,666 | 1/1958 | Grochmal | 296/171 |
| 3,719,386 | 3/1973 | Puckett et al. | 52/67 |
| 4,128,269 | 12/1978 | Stewart | 296/171 |
| 4,480,866 | 11/1984 | Komatsu | 296/26 |
| 4,500,132 | 2/1985 | Yoder | 296/171 |

OTHER PUBLICATIONS

Exhibit 1; Industry News, "Boyertown Body Gets $31 Million Contract", circa 1987.
Exhibit 2; Moex Corporation Brochure; circa 1986.
Exhibit 3; Calumet Coach Company Brochure; circa 1983.
Exhibit 4; Calumet Coach Company Brochure; circa 1978.
Exhibit 5; Southern Truck Body Corporation Brochure; circa 1981.
Exhibit 6; Brunswick Corporation Brochure; circa 1970.
Exhibit 7; Medical Coaches, Inc. Brochure; circa 1977.
Exhibit 8; GM Mobile Emissions Lab Brochure; circa 1975.
Exhibit 9; Gerstenslager Company Brochure; circa 1974.
Exhibit 10; Calumet Coach Company Brochure; circa 1979.
Exhibit 11; Gerstenslager Company Brochure; circa 1982.
Exhibit 12; Gerstenslager Company Brochure; circa 1977.
Exhibit 13; "Volkswagen Introduces Mobile Laboratory to Measure Exhaust Emissions"; Aug. 1986.
MIL-S-62472A(AT); Jul. 1987.
Medicoach Brochure, "Mobile Instrumentation, Computer and Laboratory Units"; Aug. 1986.
IKO Brochure, "Linear Way Series—Linear Roller Way"; circa 1987.
Industrial Devices Corporation Brochure, "15D Series Electric Cylinders"; circa 1987.
Seal Master Inflatable Seals 1974.

*Primary Examiner*—Robert R. Song
*Attorney, Agent, or Firm*—Cushman, Darby & Cushman

[57] ABSTRACT

An expandable transportable enclosure is described which includes an environmentally protected expandable section. The expandable section extends away from the body of the enclosure and includes an inflatable seal which fills the gap located between the expandable section and the body of the enclosure. The environmentally protected expandable section also includes a retractable floor which is raised off the bottom of the expandable section to insulate the floorboard from the exposed, bottom surface of the expanded section. Finally, an automatically retracting cover, over the expandable section, is provided to prevent the accumulation of snow, water, dirt, or other environmental elements on the top of the expandable section. The environmentally protected unit thus provides a comfortable and weather insulated expanded, interior trailer space without the requirement of costly manufacturing.

10 Claims, 8 Drawing Sheets

ENVIRONMENTALLY PROTECTED EXPANDABLE TRAILER

FIELD OF THE INVENTION

This invention relates to an environmentally protected, expandable trailer. More particularly, this invention relates to a trailer having expandable sides including an inflatable weather seal; a retractable, raised floor; and a retractable cover.

BACKGROUND OF THE INVENTION

Trailers including expandable sides are well known in the art. The expandable trailers are used as medical coaches for, for example, mobile medical or dental offices, mobile surgical hospitals, and disaster response centers. The expandable trailers may also be used for educational centers such as bookmobiles, children's labs, and police/fire trainers, for canteen units, bloodmobiles, and other uses which require expansive floor space for equipment or inventory in a mobile unit.

The expanding sides of the trailer provide an enlarged floor space on a standard trailer without increasing the transportation width or length. When the portable trailer is moved to the desired location, the expandable sides extend perpendicularly from the sides of the trailer to provide additional floor space within the interior of the trailer.

Prior art trailers include a non-inflatable, lip-type seal mounted on either the expandable section, the trailer opening perimeter, or a combination of both. If the sides of the expandable section are not exactly square with the body of the prior art trailer, the seal will not fully close the gap between the walls of the expandable section and the sides of the trailer, leaving openings for water, dust, air and snow to pass through. Prior art trailers, therefore, require a high working precision between the sides of the expandable section and the exterior surface of the trailer to prevent the expandable sections from leaking or otherwise exposing the interior of the trailer to adverse environmental elements. The propensity of the prior trailers to expose the interior of the trailer to the environmental elements was caused by the inability of the prior art trailers to effectively and inexpensively seal the gap between the sides of the expandable sections and the body of the trailer.

Expandable sections on prior art trailers were extended and retracted using ordinary rack and pinion sliding mechanisms on each of the four sides of the expandable sections. Gear assemblies, mounted on the frame of the trailer, coordinated with corresponding gear racks on each of the sides of the expandable sections. Each rack and pinion sliding mechanism was then motor controlled to automatically extend and retract the expandable sections during working and transporting modes, respectively. Unfortunately, each rack and pinion mechanism required precise alignment with every other rack and pinion mechanism on the expandable section to insure the smooth and uniform extending and retracting operations of the expandable section. Even minute misalignment between any of the rack and pinion mechanisms, caused by a foreign object in any individual gear assembly or by imprecise miter box controllers for the system of gear assemblies, resulted in, at best, an uneven gap in the expandable section and, at worst, a completely bound and inoperable expandable section.

But, because of the slidable nature of the expandable section within the body of the trailer, some gap, however small, between the sides of the expandable section and the body of the trailer, was required to allow the expandable section to move within the opening. Even though a narrow gap was difficult and expensive to obtain with prior art designs, certain trailers required an extremely low gap tolerance, such as medical and dental trailers, in which sterile environments were desired. In these applications, and others which require an environmentally protected trailer interior, the prior art trailers were required to maintain a precisely aligned opening by careful and close control over the driving alignment between each of the rack and pinion sliding mechanisms and the miter boxes distributing the power from the gear motors to the individual gear assemblies to insure that the seal was effectively aligned within the trailer opening. The difficulty of precisely controlling each of the rack and pinion sliding mechanisms and the miter boxes driving the sliding mechanisms dictated that perfect alignment between the expandable section and the body of the prior art trailer was impossible and, even extremely close alignment was extremely expensive to acquire.

Due to the inability of trailer manufacturers to provide an inexpensive, expandable section for a trailer which effectively sealed the interior of the trailer from the environmental elements, expandable trailers were generally inappropriate or unfeasibly costly for sterile or super-clean applications.

The prior art trailer further lacked adequate environmental protection by requiring those using the expandable trailers to take the extra precautions to sweep off snow, water and dust from the top of the expandable section before retracting the section into the body of the trailer, to prevent the elements from riding into the trailer on top of the expandable section during retraction. Again, complete environmental protection, including reducing the amount of accumulated snow, water and dirt which entered the trailer during retraction of the expandable section, could only be achieved by a precise working alignment between the walls of the expandable section and the body of the trailer since only a precisely aligned expandable section would push the accumulated elements from the top surface of the expandable section during retraction.

Even a precisely manufactured prior art trailer, having a narrowly constructed gap immediately after manufacture, was susceptible to the effects of transit shock on the gap alignment. Torsional forces exerted on the expandable section within the trailer body during transit would degrade the "squareness" of the expandable section within the body of the trailer to further encourage misalignment between the rack and pinion sliding mechanisms. Consequently, investing the expense to manufacture an expandable trailer to accommodate low tolerance applications was impractical since the trailer was quickly misaligned by the wear of transportation. An expandable trailer section is needed which simply and inexpensively secures the expandable section against the effects of transit shock to substantially eliminate misalignment associated with transit.

Prior art trailers were also unable to seal hot and cold air drafts from the interior, expanded trailer space rising from the temporary floor panels within the expanded section. Prior art trailers used multiple floor panels, either completely removable or foldable on hinges, to be removed or raised while the expandable section was retracted and lowered while the expandable section was extended. The floor panels were laid end to end within the expanded interior space of the trailer to create a level floor and were generally ineffective in sealing the gaps created between the respectively lowered floor panels. Buckling, warping, splitting and cracking in the multiple floor panels contributed to the misalignment of the floor panels when they were lowered to the floor level, permitting hot and cold air drafts to rise from the floor through the gaps created by the misaligned panels. An expandable trailer is needed which effectively seals the interior of the expandable section from air drafts raising from the floor of the expandable section.

In summary, for applications in which the extra floor space provided by an expandable trailer would be desirable, the expense and complications associated with obtaining a well-aligned and well-sealed trailer was generally prohibitive. A mobile trailer, having expandable sections to increase the interior floor space, is needed in which the expandable sections simply, cheaply and effectively protect the interior of the trailer from the various adverse environmental elements.

SUMMARY OF THE INVENTION

In order to overcome the above disadvantages of known expandable trailers, the present invention provides an environmentally protected, expandable trailer unit including linear guideways to uniformly retract and extend the expandable sections; an inflatable seal between the expandable section and the body of the trailer to fill the gap between these structures; an automatically retractable, single piece, raised floor within the expandable section to insulate the interior floor of the expandable section from the exterior bottom of the expandable section; and an automatically retractable top cover for the expandable section to prevent the accumulation of snow, water, dirt, or other substances onto the top of the expandable section.

First, the present invention remedies the problem of misalignment during extension and retraction of the expandable section by replacing the rack and pinion sliding mechanisms with linear guideways. The linear guideways eliminate the problems associated with the rack and pinion gear assemblies such as bindings and nonuniform gaps resulting from the intrusion of foreign objects into the gear assemblies and the imprecise control methods over the gear driving mechanisms. The present invention provides linear guideways to eliminate the gear assemblies associated with the rack and pinion mechanisms and to improve the uniformity of the extension and retraction operations. With the present linear guideways, the expandable section can be smoothly and uniformly moved by a single force exerted at any location on the expandable section. Thus, while the prior trailer designs required simultaneous and uniformly distributed forces at several locations on the expandable section via the multiple gear assemblies, the present invention requires only a single force to uniformly move the expandable section along the linear guideways.

Next, an inflatable seal is secured within the gap created by the sides of the expandable section and the body of the trailer. The inflatable seal may be deflated while extending or retracting the expandable section and inflated when the expandable section reaches the desired location (fully extended, fully retracted or somewhere between). In this manner, the gap between the sides of the expandable section and the body of the trailer is effectively sealed from the external environment by the inflatable seal. Yet, the inflatable seal does not hinder the extending or retracting operation of the expandable section since it may be deflated to open the gap and allow the expandable section to move freely within the trailer opening along the linear guideways.

The quality of prior expandable sections was identified by the extent to which dimensions of the expandable section approached the dimensions of the trailer opening. The present invention, however, provides that the tolerance to which the expandable section and the corresponding trailer opening must be built to insure proper fit and clearance may be ¼" or larger. The lower working tolerance required by the present expandable trailer to maintain the desired quality results from the inflatable seal efficiently filling gaps within the trailer opening as large as the predetermined size of the fully inflated seal. Thus, since a low gap tolerance is not required by the present invention, due to the ability of the inflatable seal to adequately fill a larger size gap, the intricate alignment structures required by prior expandable trailers may be eliminated and the cost of manufacture of the expandable section may be reduced.

When the expandable sections are retracted and the seals are inflated, the expandable sides become an integral part of the trailer body structure. The combination of the linear guideways integrally guiding the expandable section with respect to the trailer frame and the inflated seal integrally fixing the expandable section to the trailer frame, via the trailer body, effectively reduces the torsional twisting ordinarily exerted on the expandable section during transit and prevents the shock of transit from throwing the expandable section out of alignment with the body of the trailer.

The interior space of the present expanded section also protects against entrance of environmental elements through the floor assembly. A single piece, environmentally sealing retractable floor is provided in the expandable section to insulate the actual floor in the expandable section from the externally exposed bottom of the expandable section. The single piece floor is automatically retractable and protects the internal environment of the expandable section by providing a positive barrier against hot or cold air drafts rising from the bottom of the expandable section.

To complete the weather resistance of the present expandable section, a cover is provided above the expandable section to prevent rain, snow, or dirt from accumulating on the top of the expandable section when it is extended. A weather tarp is provided on the expandable section which automatically rolls and unrolls when the expandable section is retracted or expanded, respectively. The cover, in combination with the inflatable seal, provides a system which effectively eliminates the entrance of environmental elements, such as snow, rain and dirt, to the interior of the trailer via the gap between the expandable section and the body of the trailer. The inflatable seal prevents the environmental elements from entering the gap when the expandable section is extended or retracted, and the cover prevents accumulation of snow, water or dirt on the top of the expandable section, which might otherwise be transported into the trailer, through the gap, upon retraction.

The floor, linear guideways, inflatable seal, and cover of the present invention thus support a novel expandable section of an expandable trailer to increase the inner space of the trailer space while maintaining an inexpensive, substantially weather sealed internal environment.

In accordance with these and other objects which will become apparent, the present invention will be described with particular reference to the accompanying drawings.

DETAILED DESCRIPTION OF THE PREFERRED EMBODIMENT

The present invention provides an expandable section attached to a known trailer which provides distinct advantages over prior expandable sections by including positive barriers to adverse environmental conditions such as rain, snow, dirt and hot/cold air. Although this invention is described below as applied to a trailer, the invention is not limited to trailers and may be used with trailers, coaches or other transportable enclosures equally well.

Figure 1:
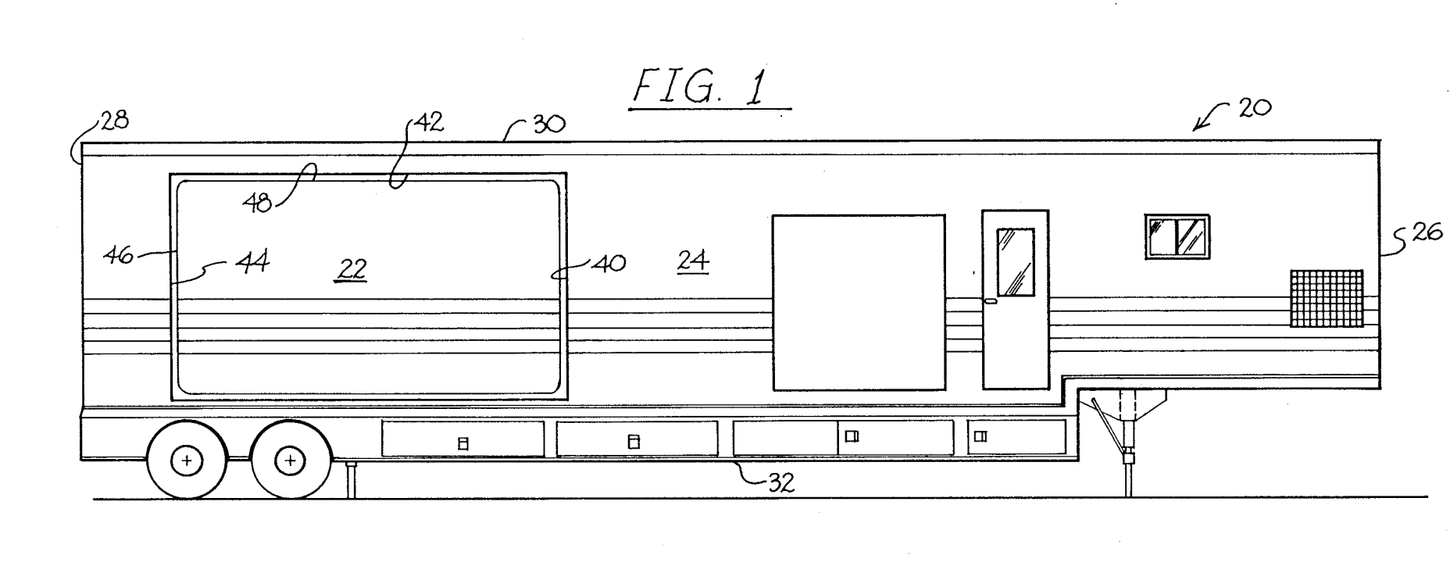
FIG. 1 is a side view of an expandable trailer according to the present invention.

FIG. 1 illustrates the trailer 20, which includes the expandable section 22. The trailer 20 may be a standard trailer to be attached to a known tractor (not shown) to transport the trailer 20 to a desired location. Alternatively, the expandable section 22 may be included in a self-contained, motorized vehicle or may be included in a non-motorized, permanent structure. The trailer 20 is rectangularly shaped, including two sides 24, a front 26, a rear 28, a top 30, and a bottom 32.

At least one side 24 of the trailer 20 includes an opening 40 having an opening length, generally identified by numeral 42, and an opening height, generally identified by numeral 44. Alternatively, the opening may be created in both sides 24, in the top 30 or any other trailer surface. The expandable section 22 is rectangularly shaped and has an expandable section height, generally identified by numeral 46, and an expandable section length, generally identified by numeral 48. As illustrated in FIG. 1, the expandable section height 46 is slightly smaller than the opening height 44 and the expandable section length 48 is slightly smaller than the opening length 42 to create a running gap between the surface of the expandable section and the body of the trailer. In this manner, the expandable section 22 may be slid into the opening 40 of the side 24 for retraction and expansion within the opening 40, as necessary.

Figure 2:
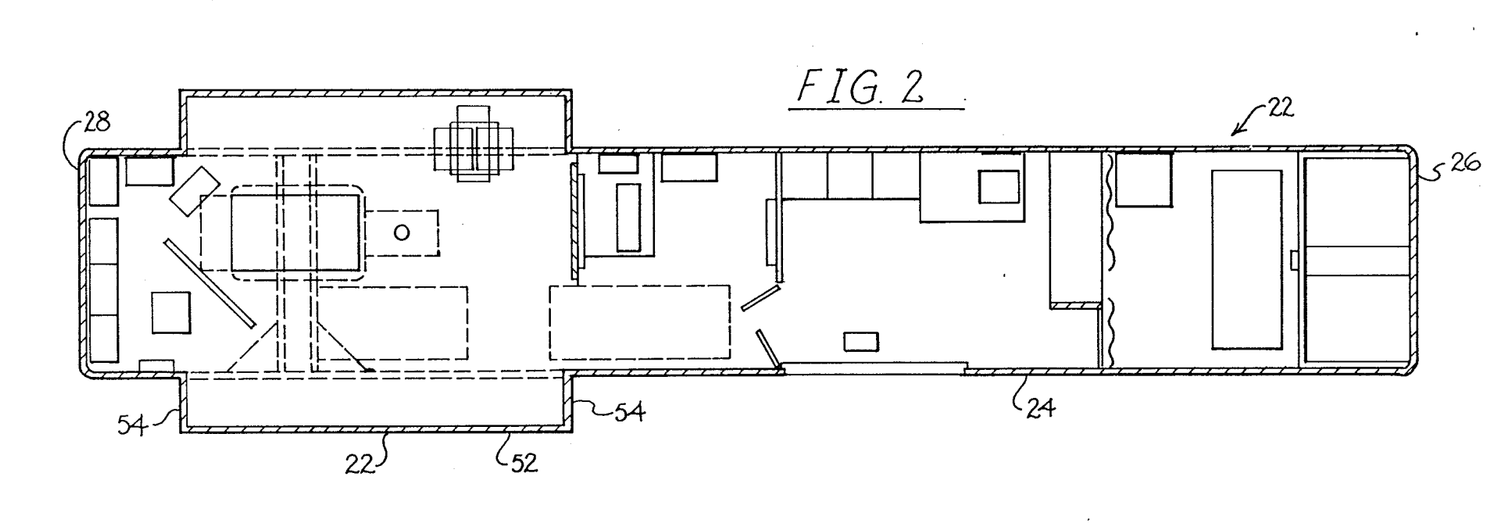
FIG. 2 is a top view of the expandable trailer, with the expandable sections extended.

FIG. 2 illustrates a top view of the trailer 20 with the expandable section 22 fully extended. The expandable section 22 is defined by a face 52 and four walls 54 connected perpendicularly to the edges of the face 52. Together, the walls 54 and the face 52 resemble a box which is slid within the opening 40 in the side 24 of the trailer 20, with the face 52 of the expandable section extending away from the trailer 20 when the expandable section is extended.

Figure 3:
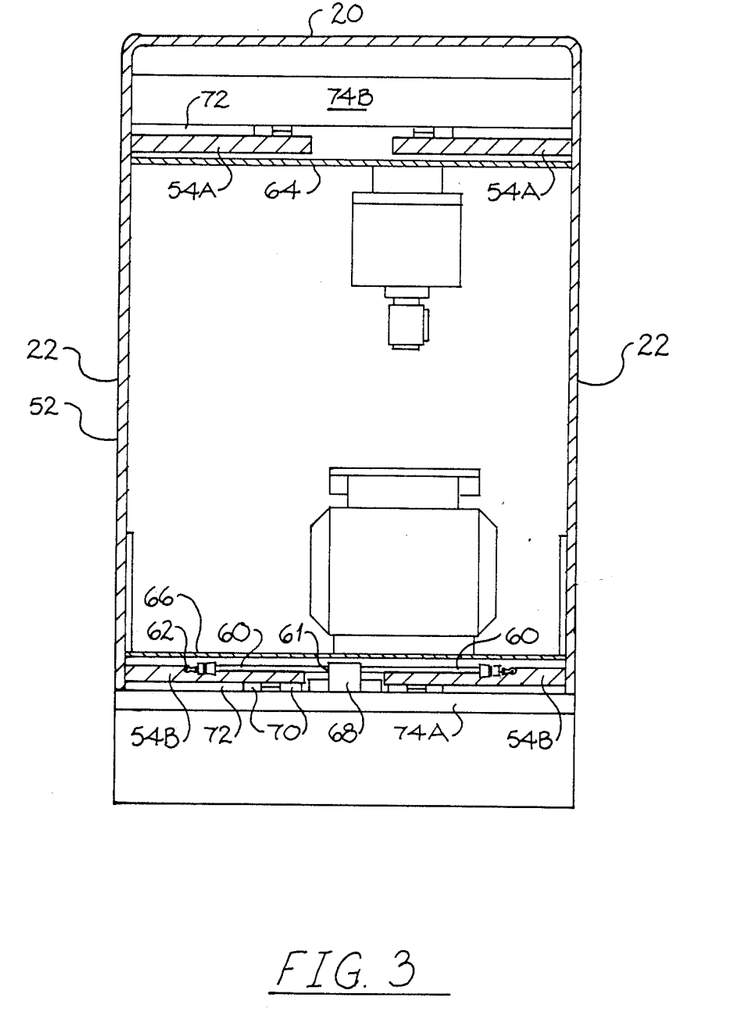
FIG. 3 is a cross-sectional view of the trailer including the unextended expandable section.
Figure 4:
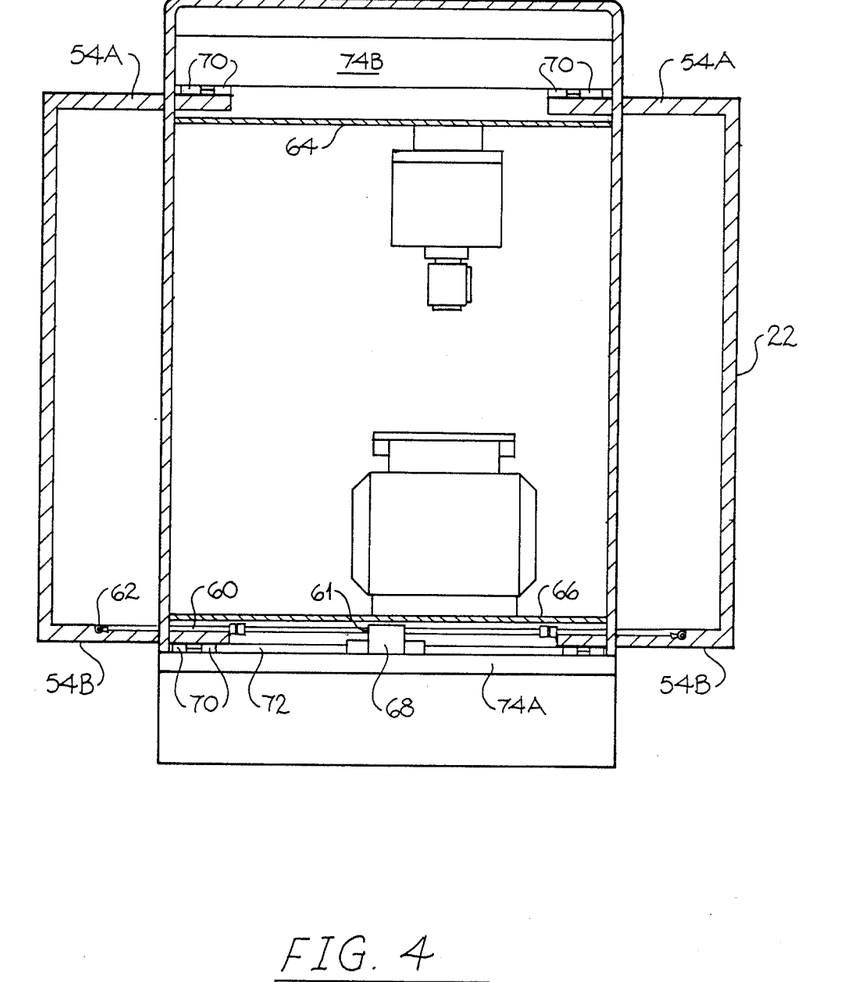
FIG. 4 is a cross-sectional view of the trailer including the extended expandable section.

FIGS. 3 and 4 illustrate a cross-section of the trailer 20 taken along the plane A—A illustrated in FIG. 2. Particularly, FIG. 3 shows the expandable section 22 retracted into the body of the trailer 20. The upper wall 54a slides within a passageway located above the ceiling 64 of the body of the trailer 20. Similarly, the lower wall 54b slides within a passageway located beneath the permanent floor 66, within the body of the trailer 20.

The expandable section 22 is retracted and extended by actuators 60 located within the passageway beneath the permanent floor 66. One end 61 of the actuator 60 may be permanently secured to the frame of the trailer. The opposite end 62 of the actuator 60 may be secured to the lower wall 54b at a particular location so the face 52 of the expandable section 22 is flush with the sides 24 of the trailer 20 when the actuator 60 is fully compressed. As the actuator 60 extends, it extends the expandable section 22 away from the trailer 20 to a predetermined maximum position dictated by the intended load to be placed within the expandable section and the ability of the expandable section to withstand the coupling forces created by the intended load.

While only a single actuator 60 is required by the present invention to smoothly and uniformly extend and retract the expandable section, the preferred embodiment includes two actuators 60 attached to the lower wall 54b of each expandable section 22. The two actuators 60 will extend the walls of the expandable section 22 substantially uniformly with respect to the sides 24 of the trailer 20. Alternatively, the actuators may be connected to any combination of the expandable section walls to effectively move the expandable section within the low tolerances dictated by the present invention. The actuators 60 may be extended by electric motors 68 connected to the actuators 60, as shown in FIGS. 3–4, or may be extended by an ordinary hand crank (not shown). The actuators may be designed in combination with the motors 68 to lock the actuators in place when the motor is not energize. A push button controller to cue the operation of the motors to extend or retract the expandable section may also be provided.

The expandable section 22 is equipped with guideways including bearingways 70 cooperating with slides 72 mounted on the lower and upper frames 74a and 74b. The guideways may be linear roller ways manufactured by IKO International Corp. of Pine Brook, N.J. Two slides 72 are mounted on each of the lower and upper frames 74a and 74b with two bearingways 70 engaged along each slide 72. The four bearingways 70 are designed to uniformly guide the expandable section 22 as it is extended by the actuators 60. In this manner, the expandable section 22 will extend substantially perpendicularly from the trailer 20 to create an approximately uniform gap. Alternatively, the expandable section 22 may extend from the trailer 20 at a predetermined angle, where the slides 72 are angled to guide the expandable section 22 away from the trailer body at the desired angle. The expandable section may also swing from the body of the trailer to a predetermined angle rather than extend directly out of the trailer at the predetermined angle.

The slides 72 and bearingways 70 precisely maintain the expandable section within tolerable alignment while in expanded and retracted positions. Thus, complicated combinations of gears and slides, as required by the prior designs to maintain the alignment, are not required by the present invention. While prior designs required drive gears mounted on the trailer frame and corresponding gear racks mounted to the expandable section, the present invention properly aligns the expandable section with the trailer opening using simple bearingways cooperating with linear slides. Further, prior designs required miter boxes to evenly rotate each gear assembly operating on the expandable section and speed reducers to prevent misalignment of the gear drives and racks due to sudden rotation. The present invention disperses with these structures.

As illustrated in FIGS. 3 and 4, all parts of the alignment apparatus provided by the preferred embodiment are located within the structure of the expandable section and are not exposed to the environment. Thus, corrosion and deterioration of the alignment components is reduced by the present design. Even though the components are not exposed to the environment, access to the alignment parts and the actuator 60 is quickly achieved through the retractable floorboard, as discussed below.

Figure 5:
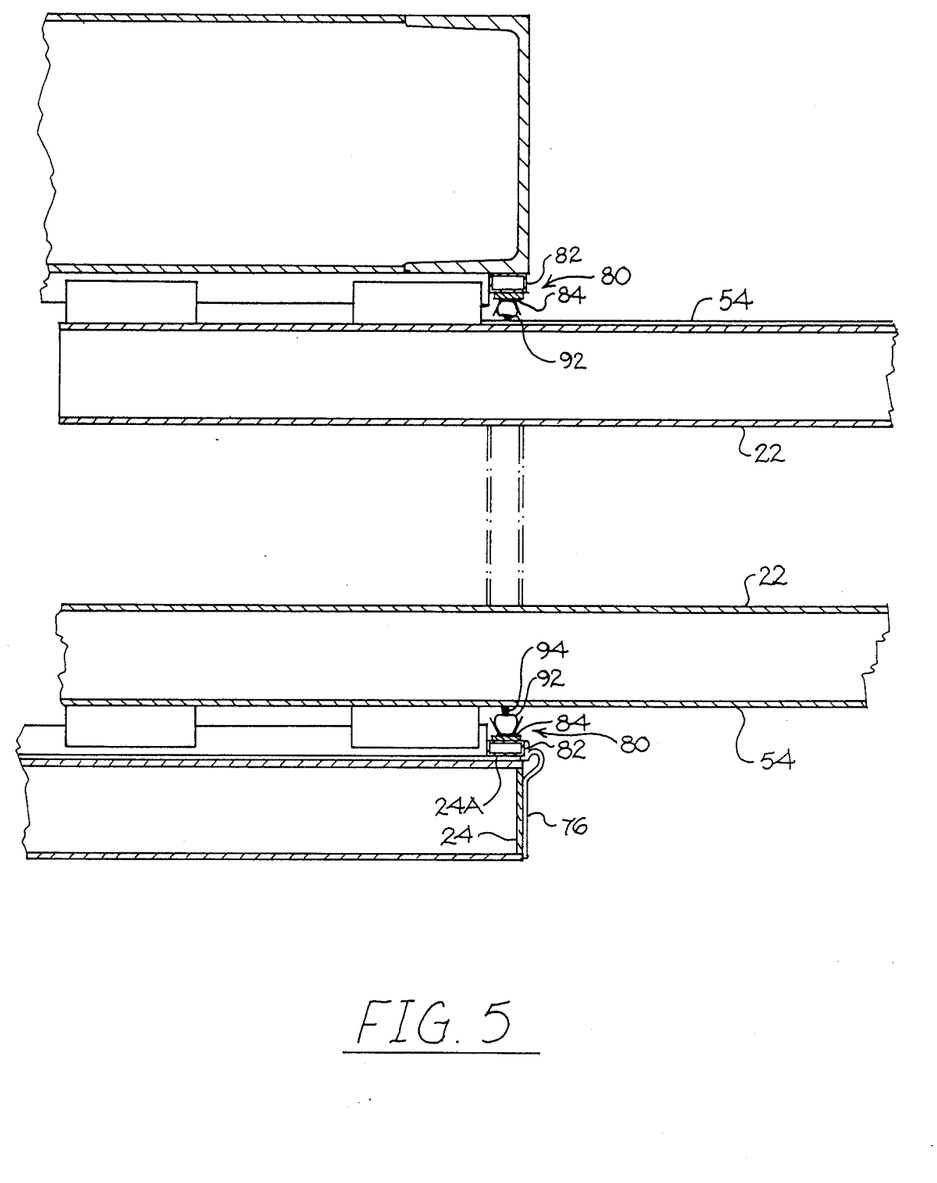
FIG. 5 is a detailed cross-sectional view of the expandable section including the inflatable seal.

FIG. 5 illustrates the structure located within the gap created between the wall 54 of the expandable section 22 and the side 24 of the trailer 20. The side 24 runs generally perpendicularly to the wall and then bends 90° into the trailer body to form a parallel side portion 24a, which is parallel to and in the vicinity of the wall 54. An aluminum rubrail 76 may also be attached to the exterior surface of the side 24 to protect the body of the trailer from abrasions and scratches.

The parallel side portion 24a and the wall 54 define a gap 80, which, without protection, will expose the interior of the trailer to the external environment. An inflatable seal is disposed within the gap to seal the gap 80 when the expandable section 22 has been extended or retracted to prevent exposure of the interior of the trailer to the exterior environment through the gap 80. The inflatable seal may be of a type manufactured by Seal Master Corp. of Kent, Ohio.

First, a tube 82 is mounted on the parallel side portion 24a to fill a portion of the gap 80. The thickness of the tube 82 will depend upon the size of the fully inflated seal and the size of the gap to be filled. The thickness of the tube should be chosen so the remaining, unfilled portion of the gap 80 is larger than the deflated size of the inflatable seal, yet smaller than the fully inflated size of the inflatable seal. For structures with gap widths between the parallel side portion 24a and the expandable section wall 54 which independently meet the size relationship described above, a tube 82 to partially fill a portion of the gap 80 may be unnecessary.

Figure 6:
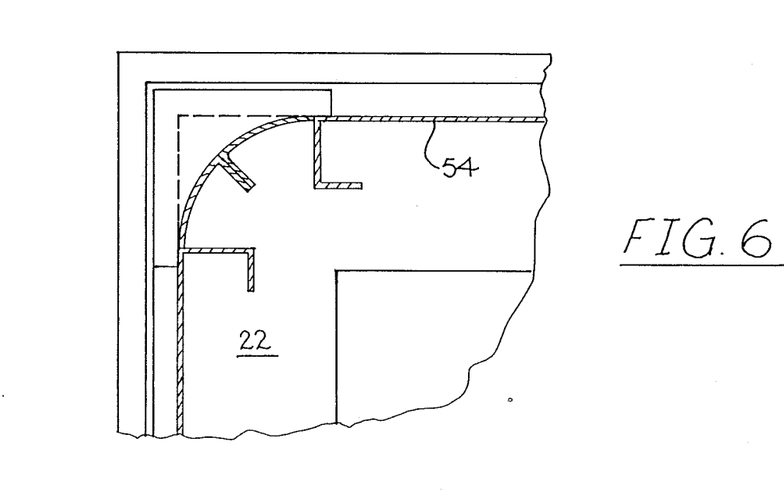
FIG. 6 is a cut-away view of the front corner of the expandable section.
Figure 11:
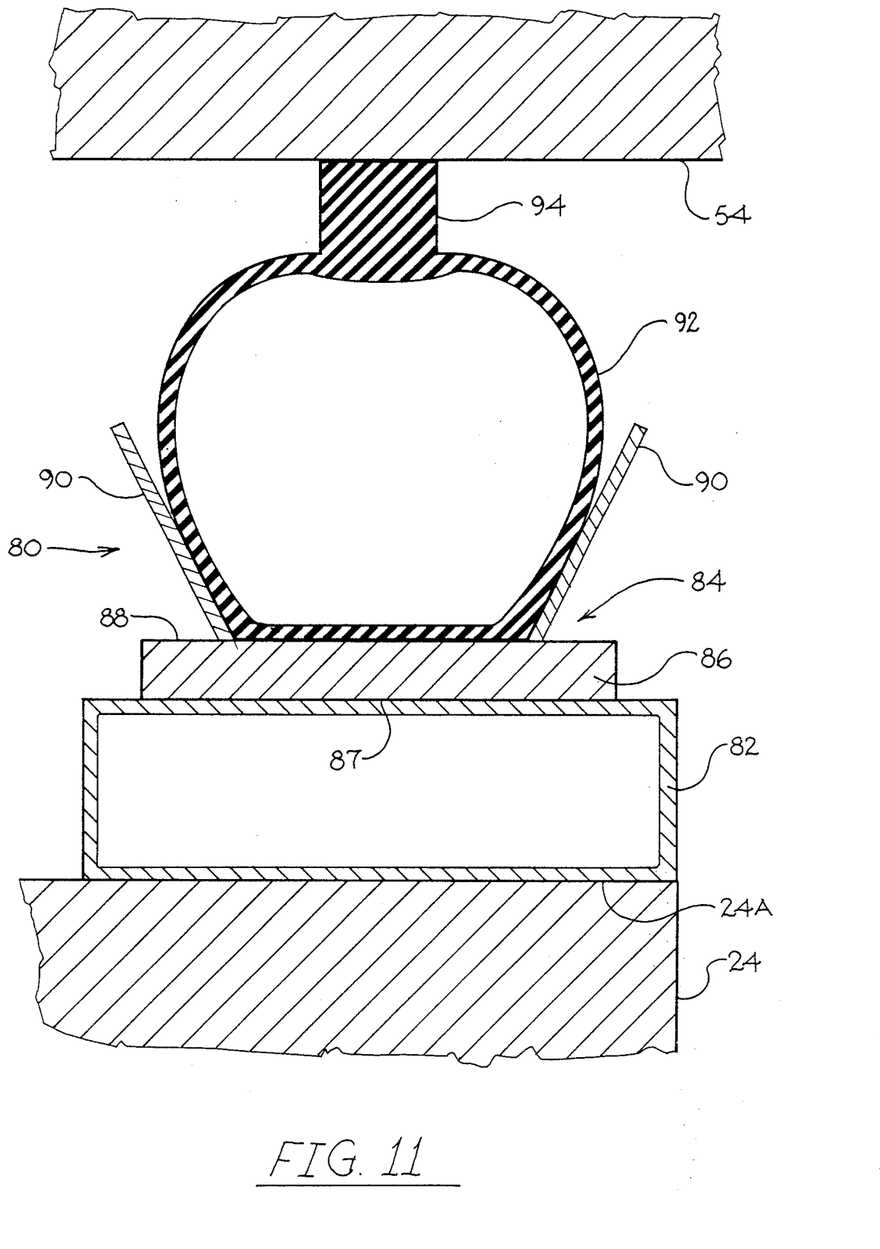
FIG. 11 is a detailed view of the inflatable seal assembly of FIG. 5.

A retainer 84 is secured to the tube 82. The retainer includes a base 86 adhesively secured along a base tube surface 87 of the base 86 and includes retainer walls 90 secured along one edge to a base balloon surface 88 of the base 86. The walls 90 and base 86 thus create a U-shaped channel, within which a balloon 92, composed of neoprene or other suitable material, is secured. The tube 82, retainer 84 and balloon 92 are then continuously mounted on each of the four parallel side portions 24a which define the opening 40 of the side 24 of the trailer 20. As shown in FIG. 6, the corners of the parallel side portions 24a and the corners of the walls 54 of the expandable section 22 are rounded to a suitable radius, for example a 5" radius, to provide a smooth, continuous perimeter surface on which to mount and expand the inflatable seal.

When the expandable section 22 is positioned into a desired location, the balloon 92 is inflated to press against the four walls 54 of the expandable section 22 to close the gap 80 around the perimeter of the expandable section. When the user desires to adjust the location of the expandable section 22, the balloon 92 is deflated to open a portion of the gap 80, within which the expandable section 22 may slide. A 90 second delay relay may also be provided to allow the inflatable seal to fully deflate before the expandable section begins moving. Once the expandable section 22 is slid into the desired position by the actuators 60 along the slides 72, the balloon 92 is reinflated to again seal the gap 80 to prevent exposure of the interior of the trailer to external environmental conditions through the gap 80 and to render the expandable section integrally connected to the body of the trailer.

Alternatively, the inflatable seal assembly may be continuously secured to each of the four walls 54 of the expandable section 22 and may be inflatable to press against the parallel side portions 24a. In this embodiment, the tube 82 would be continuously secured to the walls 54 of the expandable section 22 with the tube surface 87 facing the parallel side portions 24a. The base 86 of the retainer 87 is then attached to the surface 87 of the tube 82. The balloon 88 is then secured within the retainer 84 with its direction of inflation being forced toward the parallel side portions 24a by the retainer walls 90.

To inflate the balloon 88, a known compressor (not shown) may be attached to a nozzle on the balloon 88. The compressor may then be used to inflate the balloon once the expandable section 22 is located in the desired position (extended, retracted or somewhere between). A known regulator valve, either included on the compressor or attached to the balloon, independently of the compressor, may be used to deflate the balloon 88 before the expandable section 22 is moved.

To prevent the balloon 80 from bursting on foreign objects located on the wall 54 and to insure that the balloon is effectively sealed against the walls 54 of the expandable section 22 when it is inflated, a firm ridge 94 is mounted on the balloon 92 to engage against the wall 54 when the balloon 92 is inflated. The firm ridge 94 may be composed of neoprene or other suitable material to seal against the surface of the walls 54. The firm ridge 94 also is designed to increase the contact pressure on the walls 54 by reducing the cross-sectional area of the surface actually contacting the walls 54.

Figure 7:
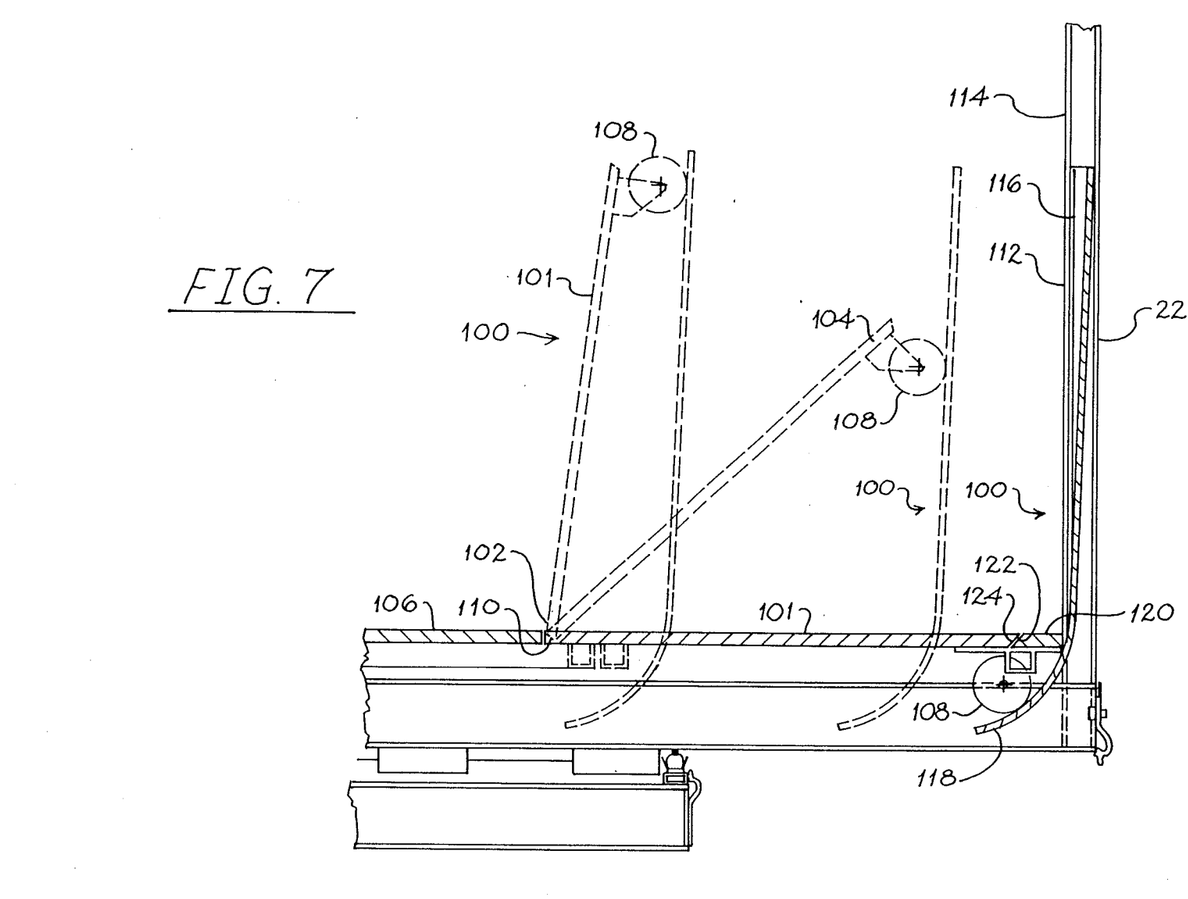
FIG. 7 is a cross-sectional view of the interior of the expandable section showing the retractable floor.

FIG. 7 illustrates a further apparatus contributing to the environmental protection of the expandable section. A retractable floor 100 is shown including a floorboard 101 having a hinged end 102 and a wheel end 104. The floorboard 101 provides a floor raised off of the bottom of the expandable section 22 which automatically retracts when the expandable section 22 is retracted and automatically lowers when the expandable section is extended. When the expandable section 22 is extended, the floorboard 101 lowers to a level flush with the permanent floor 106 of the trailer 20. This provides a level floor within the expandable section 22 and insulates the interior surface of the floorboard from the environmentally exposed lower wall 54b of the expandable section 22. The floorboard may be constructed of a single, honeycomb panel to reduce the floorboard's actual weight yet increase the floorboard's weight bearing ability.

A hinge 110 pivotally connects the permanent floor 106 to the hinged end 102 of the floorboard 101. The hinge 110 is designed to automatically allow the floor 100 to rotate between an upright position, when the expandable section 22 is retracted, and a level position, when the expandable section is extended. The hinge operates in combination with a wheel 108 mounted to the wheel end 104 of the floorboard 101 with the wheel extending perpendicularly from the bottom of the retractable floorboard 101. The retractable floor 100 will rotate from the upright position to the level position automatically when the expandable section is moved from the retracted position to the extended position by the wheel 108 rolling along a track 112 pivoting the floorboard about the hinge as the expandable section 22 is moved by the electrically driven actuators.

The track 112 is secured to the inner surface 114 of the face 52 of the expandable section 22 and thus moves with the expandable section 22 when the expandable section is retracted and extended. The wheel 108 rolls along the track 112 as the expandable section 22 is moved so the wheel 108 is resting at the upper portion 116 of the track 112 when the expandable section 22 is fully retracted and is resting at the lower portion 118 of the track 112 when the expandable section 22 is in the fully extended position. The floorboard 101 follows the movement of the wheel and is thus in the upright position when the wheel 108 is forced to the upper portion 116 by the motion of the expandable section 22 toward the fully retracted position and is level when the wheel 108 is forced to the lower portion 118 by the motion of the expandable section 22 toward the fully extended position.

To secure the retractable floor 100 at a level position when the expandable section 22 is fully extended, an angleboard 120 is secured to the interior surface 114 of the face 52 of the expandable section 22. The angleboard 120 includes a first bevel 122 at a 45° or other predetermined angle, as shown in FIG. 7. The wheel end 104 of the floorboard 101 has a mating bevel 124 corresponding to the first bevel 122 of the angleboard 120. When the retractable floor 100 is lowered to the level position, as the expandable section 22 is extended, the wheel 108 rolls against the track 112 from the upper portion 116 to the lower portion 118 until the mating bevel 124 of the wheel end 104 meets the first bevel 122 of the angleboard 120. The force of the mating bevel 124 against the first bevel 122 prevents the retractable floor 100 from rotating beyond the horizontal position when the expandable section 22 is extended. Further, the track 112 is situated with the upper portion 116 slightly off vertical and the lower portion 118 curved to correspond with the path of the wheel 108 when the retractable floor 100 is lowered.

The retractable floor 100 may be manually raised while the expandable section is extended to gain access to the actuators 60, slides 72 and other extension and alignment structures for maintenance or repair.

Figure 8:
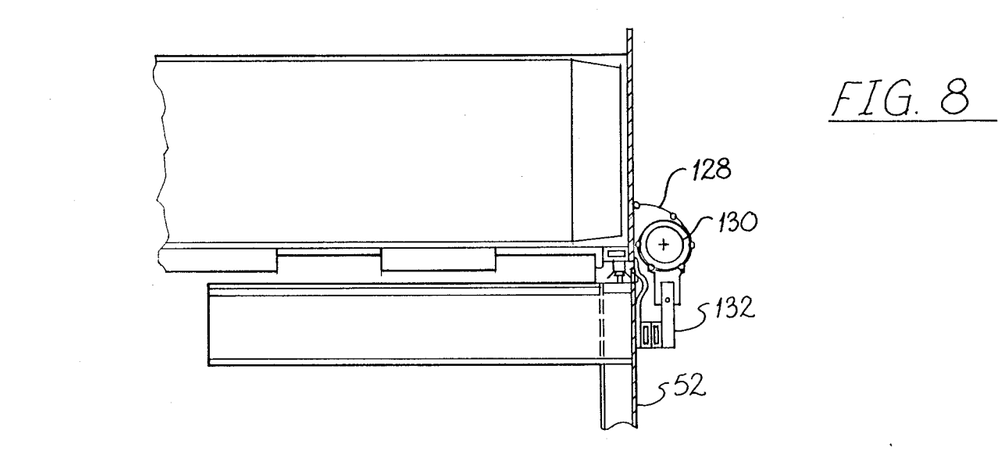
FIG. 8 is a cross-sectional view of the expandable section with the unextended cover assembly.
Figure 9:
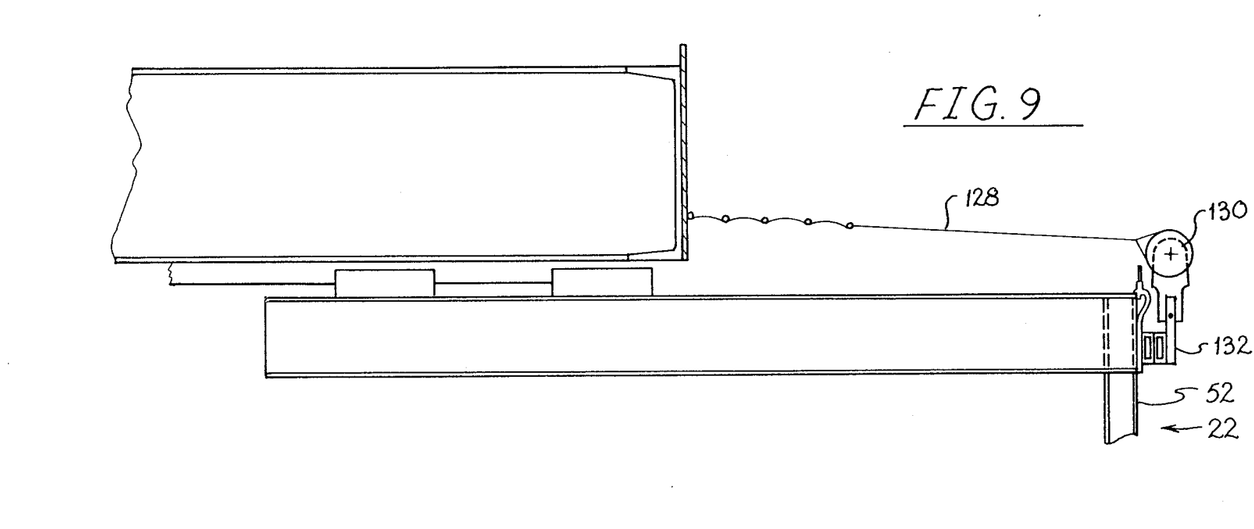
FIG. 9 is a cross-sectional view of the expandable section with an extended cover assembly.
Figure 10:
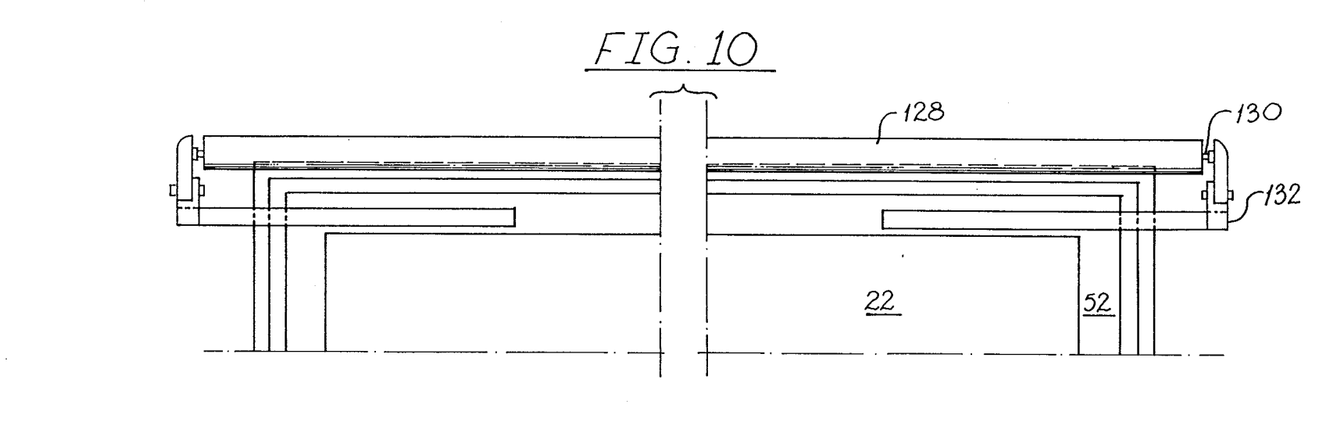
FIG. 10 is a front view of the cover assembly.

The final environmental protection feature of the expandable section 22 of the trailer 20 is an automatically expandable and retractable cover 126, as shown in FIGS. 8 through 10. FIGS. 8 and 9 illustrate the cover apparatus when the expandable section 22 is retracted and extended, respectively, into the body of the trailer 20. FIG. 9 is a cut-away view taken along plane B—B of FIG. 2. A tarp 128 is neatly rolled onto the exterior surface of a roller 130. The roller 130 is secured to the face 52 of the expandable section 22 by a roller support 132. As shown in FIG. 9, as the expandable section 22 is extended, the roller 130 moves with the face 52 of the expandable section 22. The tarp 128 is secured to the side 24 of the trailer 20 along one edge. The opposite edge of the tarp 128 is secured to the roller 130 so the tarp 128 is extended over the top of the expandable section 22 when the expandable section 22 is extended.

The roller 130 is spring-loaded to rotationally bias the roller 130 in the clockwise direction, as shown in FIGS. 8 and 9. In this way, the roller 130 keeps the tarp 128 taut when the expandable section 22 is extended and automatically rolls the tarp 128 onto the roller 130 as the expandable section 22 is retracted. The cover feature is important to the environmental protection of the interior of the trailer 20 to prevent the accumulation of, for example, snow, water and dirt onto the top of the expandable section 22. Without the automatically retractable cover feature, the accumulated snow, water, dirt, etc. on the top of the expandable section would be transported into the interior of the trailer through the gap 80 when the expandable section was retracted into the body.

FIG. 10 illustrates the cover assembly from the front of the expandable section with the support 132 attaching the roller 130 to the face 52 of the expandable section 22.

The inflatable seal, retractable floor, and cover apparatus of the improved expandable section 22 may thus equip an expandable unit to provide a comfortable and environmentally protected expandable interior trailer space without excessive manufacturing costs.

While the invention has been described in connection with what is considered to be the most practical preferred embodiment, the applicant does not limit the invention to the disclosed embodiment but, on the contrary intends the invention to cover various modifications and equivalent arrangements included within the spirit and scope of the appended claims.

What is claimed is:

1. A transportable enclosure, comprising:
    a transportable enclosure body including:
    a side having at least one opening at a predetermined location;
    a parallel side portion connected to the side and extending within the opening;
    at least one expandable section having a wall and being slidably engaged within the opening in a predetermined direction, the wall substantially facing the parallel side portion such that the wall and parallel side portion each extend in a plane substantially parallel to the direction of sliding of the expandable section; and
    an inflatable seal assembly, attached to one of the parallel side portion or the wall, including an inflatable seal capable of inflating toward and against the other of the parallel side portion or the wall.

2. A transportable enclosure according to claim 1, wherein:
    the inflatable seal assembly further includes a retainer, the retainer secured to said one of the parallel side portion or the wall, and the inflatable seal being secured to the retainer.

3. A transportable enclosure according to claim 1, wherein:
the expandable section includes four walls defining the perimeter, the inflatable seal encircling the perimeter.

4. A transportable enclosure according to claim 3, wherein:
the four walls are continuously connected to define four corners, the four corners being rounded to provide a smooth perimeter.

5. A transportable enclosure according to claim 1, wherein:
the body includes a plurality of sides, the expandable section includes a plurality of walls, a face, and an interior space defined by the walls and the face, the transportable enclosure further including:
a permanent floor within the sides of the body;
a track connected to the face, within the interior space; and
a retractable floor, within the interior space, including:
a floorboard, having two ends, the floorboard pivotally connected to the permanent floor at one floorboard end; and
a wheel connected to the floorboard at the other floorboard end, the wheel rotatably contacting the track.

6. A transportable enclosure according to claim 5, wherein:
the floorboard includes four edges, the four edges substantially corresponding to the interior space of the expandable section.

7. A transportable enclosure according to claim 5, further including:
an angleboard having two ends, one angleboard end being connected to the face, within the interior space, and the other angleboard end having a first bevel, the wheeled end of the floorboard having a mating bevel corresponding to the first bevel of the angleboard.

8. A transportable enclosure according to claim 5, wherein:
the track includes an upper and lower portion, the upper portion being slightly angled from vertical and the lower portion being curved toward the permanent floor.

9. A transportable enclosure according to claim 1, wherein:
the expandable section includes a top and a face; the transportable enclosure further including:
means for extending and retracting the expandable section within the opening;
a cover, including:
a tarp secured to the side of the body; and
a roller, secured to the face of the expandable section, the roller including biasing means for automatically unwinding the tarp over the top of the expandable section when the expandable section is extended and automatically winding the tarp onto the roller when the expandable section is retracted.

10. A transportable enclosure according to claim 2, wherein the retainer includes a base and retainer walls, the retainer walls connected at one end to the base and extending obliquely from the base to create a U-shaped channel, the inflatable seal connected to the base within the U-shaped channel.

* * * * *